Figure 1:
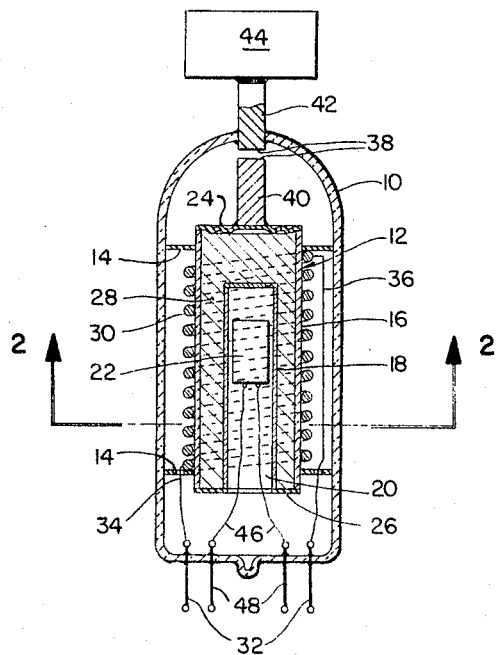

Aug. 2, 1966  D. E. LEHMER  3,264,448

TEMPERATURE CONTROL APPARATUS

Filed Dec. 29, 1964

*INVENTOR.*
DONALD E. LEHMER
BY
ATTORNEY

United States Patent Office 3,264,448
Patented August 2, 1966

3,264,448
TEMPERATURE CONTROL APPARATUS
Donald E. Lehmer, Berkeley, Calif., assignor to Beckman Instruments, Inc., a corporation of California
Filed Dec. 29, 1964, Ser. No. 421,954
12 Claims. (Cl. 219—210)

This invention relates in general, to temperature control apparatus and more particularly to a temperature controller for use with elements whose functioning accuracy is affected by changes in the environmental temperature.

In order to maintain the operating stability of certain devices such as quartz crystals used as frequency standards, the temperature of the device's surroundings must be closely controlled. It is well known that although quartz crystals exhibit a high degree of frequency stability, the environmental temperature will affect this stability. Therefore, it is desirable, in those applications in which the crystal is to be used as a frequency standard, to control the temperature of the environment as closely as possible thereby assuring the maximum frequency stability.

The apparatus of the present invention utilizes the change of state properties of minerals as a basis of operation. During the transition of matter from the solid to the liquid phase (or vice versa), the temperature of the solid-liquid mixture remains constant even though heat is added or removed. An illustration of a solid-liquid mixture is ice and water. The addition of heat to the mixture causes more of the ice to melt while cooling of the mixture causes an increasing amount of ice to be formed. When heat is added to, or removed from, the mixture, a change in volume of the mixture takes place; however, the temperature of the solid-liquid mixture remains constant. The change in volume, suitably detected, may be used to control the heat applied to, or removed from, the mixture to assure the retention of the mixture state and thereby maintain a constant temperature.

In one prior art temperature control apparatus, an electric heater, controlled by a mechanical thermostat which operates a set of electrical contacts comprising the heater circuit on-off switch, maintains the temperature of the crystal device at the desired level. Another known temperature controller uses the isothermal volume change which accompanies the change of state of a substance to operate the contacts of the electrical switching means in the supply circuit of the electric heating coil. In this type of controller, the heating coil periodically adds heat to the substance so that it will remain in the solid-liquid mixture state.

When extremely accurate temperature regulation over extended periods is required, conventional controllers of the type described above exhibit certain limitations and disadvantages. In the thermostat type, since the quantity sensed is temperature, a change in temperature is necessary for its operation. Temperature variation, however, is the very thing sought to be eliminated by a temperature controller.

Further, in both types of temperature controllers described above, the use of electrical contacts presents certain problems where accurate temperature control is required. First, frequent cycling of the contacts is required when the temperature must be held within close tolerances. Because of arcing, which usually occurs between contacts of this type when they are separated, contact surface erosion or wear results and frequent cycling may therefore substantially reduce the life of the contacts. Second, contact surface wear, even a small amount, will cause a gradual, but detectable, shift in the operating point of the apparatus which eventually may cause a shift of the crystal temperature. This is a result of the increased travel required by the movable contact in order to make the connection with the stationary contact. Third, electrical noise generated by the operation of the contacts may interfere with the operation of neighboring, sensitive electrical equipment.

Accordingly, it is an object of this invention to provide a temperature controller of improved accuracy which will maintain the temperature of a temperature-sensitive device at a predetermined level over a long period of time.

It is another object of this invention to provide a temperature controller of improved accuracy whose operating principle is based upon the change of state properties of a substance and which eliminates the need for an electrical switching means.

It is yet another object of this invention to provide a temperature controller of improved accuracy whose operating principle is based upon the change of state properties of a substance and in which the heat flow out of the substance is controlled so as to maintain at least a part of the substance in the mixture state.

In accordance with one specific, exemplary embodiment of this invention, there is provided an evacuated outer enclosure inside of which is mounted a double-walled oven having a cavity which surrounds the crystal or other device whose temperature is to be controlled. The space between the double walls of the oven is filled with a low melting point alloy which is maintained, at least in part, in a solid-liquid mixture state by means of an electrically-powered heater coil placed about the outside wall of the oven. One end of the oven is sealed by a flexible diaphragm, the inside surface of which is in contact with the alloy inside the oven. Deflection of the diaphragm results when the alloy expands due to the addition of heat to the alloy.

A "heat switch" is provided which comprises a movable contact mounted on the flexible diaphragm and a fixed contact supported by and extending through the outer enclosure and terminating at its outer end in a large metallic mass or heat sink. Expansion of the alloy, because of the addition of heat, causes outward deflection of the diaphragm, closing the contacts of the heat switch, and thereby creating a continuous path for the transmission of heat from the alloy to the heat sink. The heat removed or subtracted from the alloy by the heat sink causes the alloy to contact slightly resulting in the opening of the heat switch. The apparatus thus controls the heat transfer out of the alloy thereby maintaining at least a portion of the alloy in the mixture state.

In the steady state operating condition, a heat balance is established whereby heat supplied to the alloy by the electric heater is transferred to the crystal at a given rate and conducted away from the crystal at the same rate along the electrical lead-in wires connected to the crystal.

Figure 2:
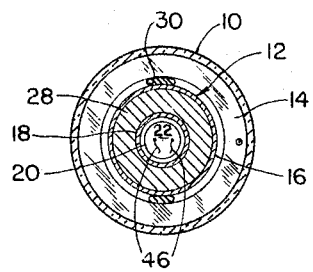

The novel features which are believed to be characteristic of the invention are set forth with particularity in the appended claims. The invention itself however, together with further objects and advantages thereof, can best be understood by reference to the following description of one embodiment taken in conjunction with the accompanying drawings in which:

FIG. 1 is a longitudinal section view of a temperature control apparatus in accordance with the present invention; and FIG. 2 is a section view taken along plane 2—2 of FIG. 1.

Referring now to the drawings, there is shown an evacuated cylindrical container or housing 10 of glass or other suitable material inside of which is mounted a temperature control oven generally designated by the numeral 12. The oven 12 may be supported inside the housing 10 by means of mica ring supports 14 dimensioned so that they frictionally hold the oven 12 in place.

The temperature control oven 12 includes an exterior metallic tubular wall 16 and an interior metallic tubular wall 18, the latter defining a cavity 20. A crystal 22, or other device whose temperature is to be controlled, is positioned inside the cavity 20. The dimensions of the cavity 20 are such that a small amount of clearance exists between the crystal 22 and the interior surface of the wall 18. The oven 12 is sealed at one end by a flexible diaphragm 24, which may be made of sheet metal, and at the other end by an end plate 26 which may be in the shape of an annular ring.

Although the particular embodiment described herein employs generally cylindrical or tubular shaped elements, it is to be understood that any shape, as may be dictated by the requirements of the particular installation, and/or the crystal configuration, may be used.

The space between the exterior and interior walls 16 and 18, respectively, is filled with a low melting point substance 28 such as an alloy or a wax or the like. An alloy which exhibits superior properties for purposes of this invention comprises 57% bismuth, 17% tin and 26% indium. This alloy has a sharp melting point, low thermal resistance, and is reasonably flexible at a few degrees below solidification. The melting temperature of this alloy is 174° F. and its expansion is about 4% upon fusion.

An electric heating coil 30 is placed about the exterior oven wall 16. Electric power from an external source is supplied to the coil 30 through pins 32 and lead-in wires 34 and 36.

Affixed to the central portion of the outer surface of flexible diaphragm 24 is a contact element 40 which comprises the movable contact of a heat switch. A fixed contact 42 is mounted in the outer housing 10, with a portion thereof extending inside the housing 10. A large metallic mass or heat sink 44, fabricated of any suitable metal, is mounted on the outer end of the fixed contact member 42. Faces 38 of the contacts 40 and 42 are separated by a small distance, the amount being dependent upon various factors among which are the actual thermal expansion characteristics of the alloy 28 and the dimensions of the oven 12.

The crystal 22, which is inserted in the cavity 20, is connected to the electrical circuit in which it is to be used by leads 46 and terminals 48 which extend through the wall of housing 10. The wire comprising the heater coil 30 and all lead-in wires are suitably insulated to prevent short-circuiting.

The vacuum in housing 10 and the use of the mica ring supports 14 to mount the oven 12 tend to eliminate heat transfer out of the temperature controller by means of conduction to the housing 10 and by convection. Theoretically therefore, the only heat transfer out of the system is by way of radiation and by conduction along the lead-in wires 34, 36 and 46 and the pins 32 and 48. Heat transfer by radiation can be minimized if the inside surface of housing 10 and the outer surface of oven 12 are covered with a coating of silver or other reflective material.

In the operation of the present invention, electrical power is applied from a substantially constant power source to the terminal pins 32 of the heater coil 30. The electrical properties of the coil 30 and the level of power applied to it are such that during normal operation, the alloy 28 is in the liquid state immediately adjacent the exterior wall 16 and in the solid state adjacent the interior wall 18. As a result, a constant temperature solid-liquid mixture junction exists somewhere between the interior and exterior walls. Heat is conducted toward the crystal from the heater coil through the liquid layer, the constant temperature mixture junction, and the solid layer, in that order. During the steady state operating condition, the heat added to the crystal just balances the heat conducted away from the crystal along the lead-in wires 46.

Heat gains are compensated for by the heat switch arrangement which comprises an important aspect of the present invention. An increasing amount of heat added to the alloy 28 causes more of the alloy to liquify. The resulting expansion of the alloy causes an outward deflection of the flexible diaphragm 24. This, in turn, causes the normally open heat switch to close, providing a path for the flow of heat from the alloy through contacts 40 and 42 and from there to the heat sink 44 which is exposed to an environmental temperature well below the average temperature of the alloy 28. The response of the system and the frequency of operation are determined by various factors, among which are the difference in temperature between the average temperature of the alloy and the external environmental temperature, the contact and heat sink material, the area of the contact faces, and the distance separating the contact faces.

It will be seen that the temperature control apparatus of this invention is exceedingly simple and accurate, and being strictly mechanical, is highly reliable. In addition, the extensive insulation provided by the vacuum in the outer housing makes possible the use of a low power source to operate the heater coil. A battery pack may be used for this purpose and a light-weight portable unit is thus provided which allows the device to be transported without disturbing the oven temperature. The elimination of electrical contacts assures that the device of the present invention will have a long, maintenance-free service life.

The embodiment described above is obviously only one way of implementing the invention using specified components. Equivalent components may be substituted for those described and still be within the limits of the invention. It should therefore be understood that there is no intention to limit the invention to the specified components and that it is intended by the appended claims to cover all variations of both components and component arrangements that fall within the true spirit and scope of the invention.

What is claimed is:

1. A method for controlling the temperature of a temperature-sensitive device, comprising the steps of
    surrounding said temperature-sensitive device with a substance having a melting point within the operating temperature range of said temperature-sensitive device;
    adding heat to said substance at a rate which tends to maintain at least a portion of said substance in a constant temperature, solid-liquid mixture; and,
    subtracting heat from said substance, when necessary, to maintain said portion of said substance in said solid-liquid mixture.

2. A temperature control apparatus for maintaining a temperature-sensitive device at a constant temperature, comprising
    an oven enclosing said temperature-sensitive device;
    said oven having a chamber filled with a substance having a melting point within the operating temperature range of said temperature-sensitive device;
    means for adding heat to said substance at a rate which, at minimum, will maintain at least a portion of said substance in a constant temperature, solid-liquid mixture; and,
    means for subtracting heat from said substance, when necessary, to maintain said portion of said substance in said solid-liquid mixture.

3. The temperature control apparatus of claim 2 which includes
    an evacuated housing enclosing said oven, the interior surfaces of said housing and the exterior surfaces of said oven having reflective coatings.

4. The temperature control apparatus of claim 2 in which
said means for adding heat includes an electric heating coil placed about the exterior surface of said oven.

5. The temperature control apparatus of claim 2 in which
said means for subtracting heat includes a heat switch and heat sink, said heat switch being operable to conduct heat from said substance to said heat sink.

6. The temperature control apparatus of claim 5 in which
said heat switch is actuated by the volumetric expansion of said substance, said expansion being a function of heat added to said substance.

7. The temperature control apparatus of claim 6 in which
one wall of said oven chamber has a flexible portion;
said heat switch comprises a movable contact affixed to said flexible portion of said oven wall and a contact held fixed relative to said movable contact; and,
said movable and fixed contacts have faces which engage when said heat switch closes upon said volumetric expansion of said substance.

8. The temperature control apparatus of claim 7 in which
said heat sink comprises a metallic mass secured to said fixed contact; and,
said substance is an alloy comprising 57% bismuth, 17% tin and 26% indium.

9. The temperature control apparatus of claim 8 in which
said constant-temperature, solid-liquid mixture portion of said alloy forms a junction between a liquid portion of said alloy lying adjacent said outer oven wall and a solid portion of said alloy lying adjacent said inner oven wall.

10. A temperature control apparatus for maintaining a temperature-sensitive device at a constant temperature comprising in combination
an outer, evacuated, sealed housing;
an oven insulatingly mounted within said housing, said oven enclosing said temperature-sensitive device;
said oven comprising an inner wall and an outer wall, said outer wall having a flexible portion, said inner wall forming a cavity adapted to receive said temperature-sensitive device;
said inner and outer walls forming a chamber adapted to be filled with a substance having a melting point within the operating temperature range of said temperature-sensitive device;
a heater coil placed about said outer wall, said coil being adapted to be electrically energized by a substantially constant power supply to maintain at least a portion of said substance in a solid-liquid mixture state;
a movable contact mounted on said flexible portion of said outer wall;
a fixed contact affixed to said housing, said fixed contact having a first end inside said housing and a second end outside said housing; and,
a heat sink affixed to said second end of said fixed contact, whereby, upon volumetric expansion of said substance, said movable contact engages said first end of said fixed contact thus providing a continuous heat path from said substance to said heat sink.

11. The temperature control apparatus of claim 10 in which
said constant temperature, solid-liquid mixture portion of said substance forms a junction between a liquid portion of said substance lying adjacent said outer oven wall and a solid portion of said substance lying adjacent said inner oven wall.

12. The temperature control apparatus of claim 11 in which
said substance is an alloy comprising 57% bismuth, 17% tin and 26% indium.

References Cited by the Examiner

UNITED STATES PATENTS

| | | | |
|---|---|---|---|
| 1,994,229 | 3/1935 | Osnos | 73—368.3 X |
| 2,338,691 | 1/1944 | Tucker | 165—104 X |
| 2,363,375 | 11/1944 | Wild | 165—30 X |
| 2,524,886 | 10/1950 | Colander et al. | 219—210 |
| 3,177,933 | 4/1965 | Webb | 236—1 |
| 3,195,620 | 7/1965 | Steinhardt | 165—30 X |

RICHARD M. WOOD, *Primary Examiner.*

ANTHONY BARTIS, *Examiner.*

C. L. ALBRITTON, *Assistant Examiner.*